United States Patent [19]

Gruber et al.

[11] Patent Number: 4,457,218
[45] Date of Patent: Jul. 3, 1984

[54] BAKING MACHINE FOR ICE CREAM CONES AND THE LIKE

[75] Inventors: Steven R. Gruber, Vienna; Dwight C. Green, Ashburn, both of Va.; Mark A. Bautista, Germantown, Md.

[73] Assignee: Classic Cone Works Ltd., Washington, D.C.

[21] Appl. No.: 430,482

[22] Filed: Sep. 30, 1982

[51] Int. Cl.³ .................. A47J 37/00; A47J 37/01
[52] U.S. Cl. .................................. 99/373; 99/374; 99/427; 425/233; 425/348 R; 425/409
[58] Field of Search ................ 99/373, 372, 380, 381, 99/426, 427, 439, 428, 443 C, 326, 327, 331, 332, 334, 335; 126/39 R, 39 A, 39 C, 39 E, 58, 116 R; 425/233, 348 R, 409, 420, 447, 441, 449

[56] References Cited

U.S. PATENT DOCUMENTS

| 1,009,355 | 11/1911 | Turnbull | 99/373 |
| 1,010,619 | 12/1911 | Groset | 99/373 |
| 1,086,448 | 2/1914 | Flagstad et al. | 99/373 |
| 1,117,929 | 11/1914 | Turnbull et al. | 99/373 |
| 1,303,128 | 5/1919 | Takahashi | 99/373 |

OTHER PUBLICATIONS

Red Ray Manufacturing Co. Spec. Sheet for AB-7 Gas-Fired Infra-Red Atmospheric Burner (2 pp.).

*Primary Examiner*—Timothy F. Simone
*Attorney, Agent, or Firm*—Joseph G. Seeber

[57] ABSTRACT

A baking machine for cooking batter to form ice cream cones and the like comprises a plurality of griddles which are driven along a path of movement through heating zones for the purpose of cooking the batter. Principal features of the invention include: an automated and responsive gear-type control mechanism for starting and stopping griddle movement, include provision of means for ensuring proper meshing of the gears; and an efficient top-bottom burner system which ensures efficient and uniform cooking of the batter by provision of separate supply lines to the top and bottom burners, respectively, as well as a master-equalizer valve arrangement in which the master valve regulates flow to all burners and the equalizer valve provides for equal heating at top and bottom burners.

11 Claims, 7 Drawing Figures

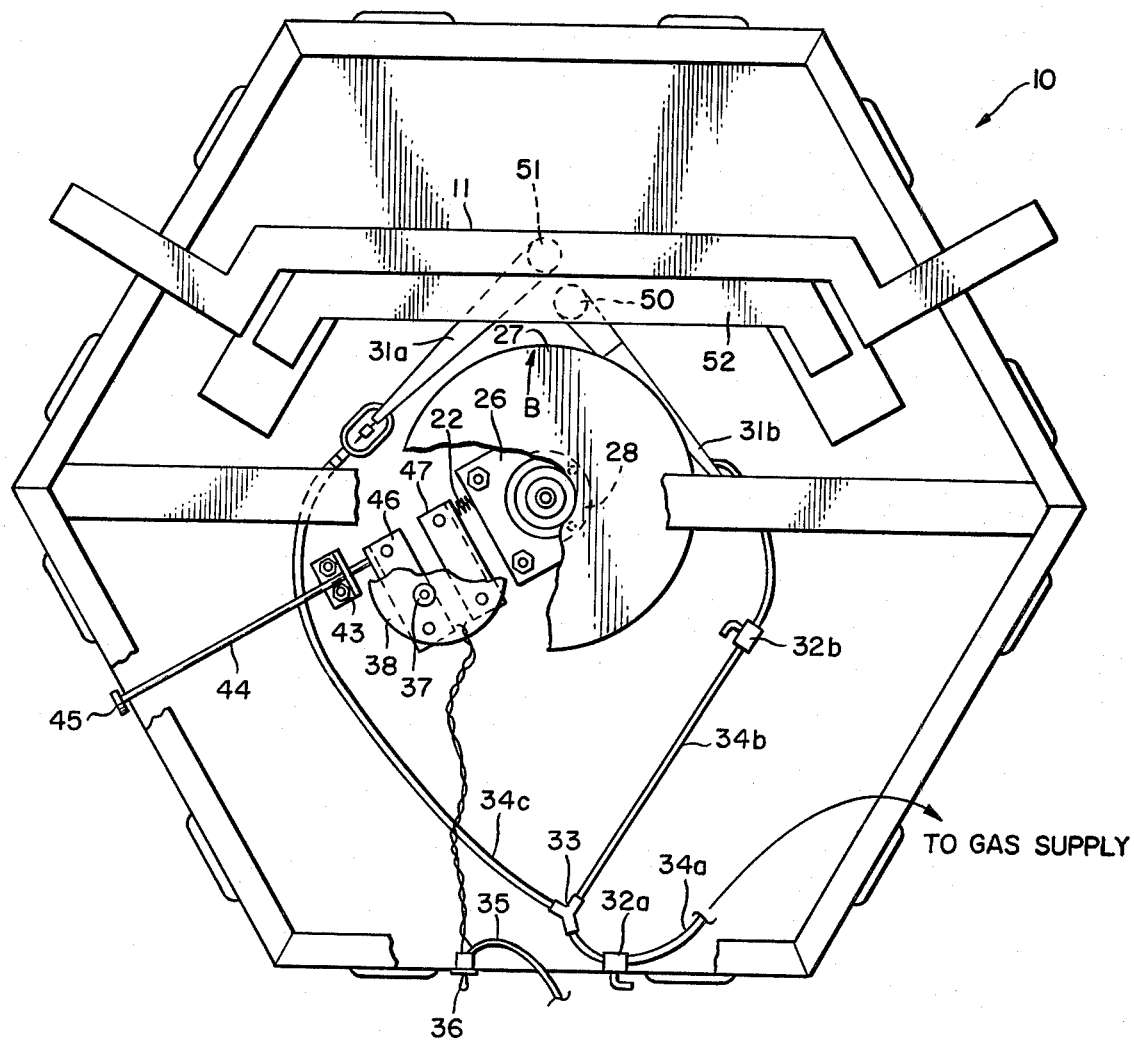

BAKING MACHINE FOR ICE CREAM CONES AND THE LIKE

BACKGROUND OF THE INVENTION

1. Field of the Invention

The present invention relates to a baking machine for cooking batter to form ice cream cones and the like.

2. Description of the Prior Art

For quite some time, various baking machines have been known in the art. Typical among such baking machines are those disclosed in the following U.S. Pat. Nos.: 1,117,929; 1,303,128; 1,010,619; 1,086,448; and 1,009,355.

However, such baking machines are burdened by several disadvantages. For example, prior art baking machines are not fully automated with the provision of operator actuable clutch means for selectively engaging or disengaging the motor to selectively drive or not drive a support for moving a plurality of griddles along a path through a heating zone adjacent to upper and lower heating units.

Furthermore, such machines of the prior art do not include a fully responsive control mechanism for use by the operator in starting movement of the griddles or stopping movement of the griddles. Moreover, machines of the prior art do not include a control mechanism which provides for proper meshing of the gears upon commencement of motion of the griddles.

As mentioned previously, prior art machines do not include at least one pair of burners including a top burner and a bottom burner mounted above and below the plane of movement of the griddles. In that regard, prior art arrangements do not include techniques for ensuring that gas supply to the top and bottom burners is equal, and this equal heating by the top and bottom burners, respectively, is not ensured.

SUMMARY OF INVENTION

According to the present invention, there is provided a baking machine for cooking batter to form ice cream cones and the like.

The baking machine of the present invention is fully automated by virtue of the provision of a motor in conjunction with an operator actuable clutch mechanism for selectively and responsively engaging or disengaging the motor to selectively drive or not drive a plurality of griddles along a path through a heating zone.

Preferably, the clutch mechanism includes first and second gears selectively movable with respect to each other, in combination with a control mechanism including a control rod which can be operated to force the gears together in an operating position, or which can be operated to release the gears from the operating position. Release of the gears from the operating position is facilitated by provision of a spring extending between the gear mountings.

In addition, the spring is provided with a stop screw axially mounted within the spring and extending between the gear mountings to limit movement of the gears toward each other, thus providing proper meshing of the gears. Preferably, the stop screw is adjustable.

In addition, the baking machine of the present invention includes at least one pair of top and bottom burners mounted above and below a plane of movement of the griddles, together with a gas supply line for supplying gas to the burners. Preferably, the gas supply line includes a main supply line connected to top and bottom supply lines, with a master valve being provided in the main supply and an equalizer valve being provided in either the top or bottom supply line for ensuring equal heating by the top and bottom burners. Preferably, the equalizer valve is positioned in the bottom supply line.

Therefore, it is an object of the present invention to provide a baking machine for cooking batter to form ice cream cones and the like.

It is an additional object of the present invention to provide a baking machine having a fully automated and responsive mechanism for moving the griddles along a path through one or more heating zones.

It is an additional object of the present invention to provide a gear-like control mechanism in which meshing of the gears is optimized.

It is an additional object of present invention to provide a baking machine having an efficient heating mechanism including top and bottom burners.

Finally, it is an additional object of the present invention to provide a baking machine having heating means including top and bottom burners, wherein an equalizer valve is provided for equalizing the heat generated by the top and bottom burners.

The above and other objects that will hereinafter appear, and the nature of the invention will be more clearly understood by reference to the following description, the appended claims and the accompanying drawings.

BRIEF DESCRIPTION OF DRAWINGS

FIG. 4 is a bottom view of the baking machine of the invention.

DETAILED DESCRIPTION

The invention will now be more fully described with reference to the figures.

Figure 1:
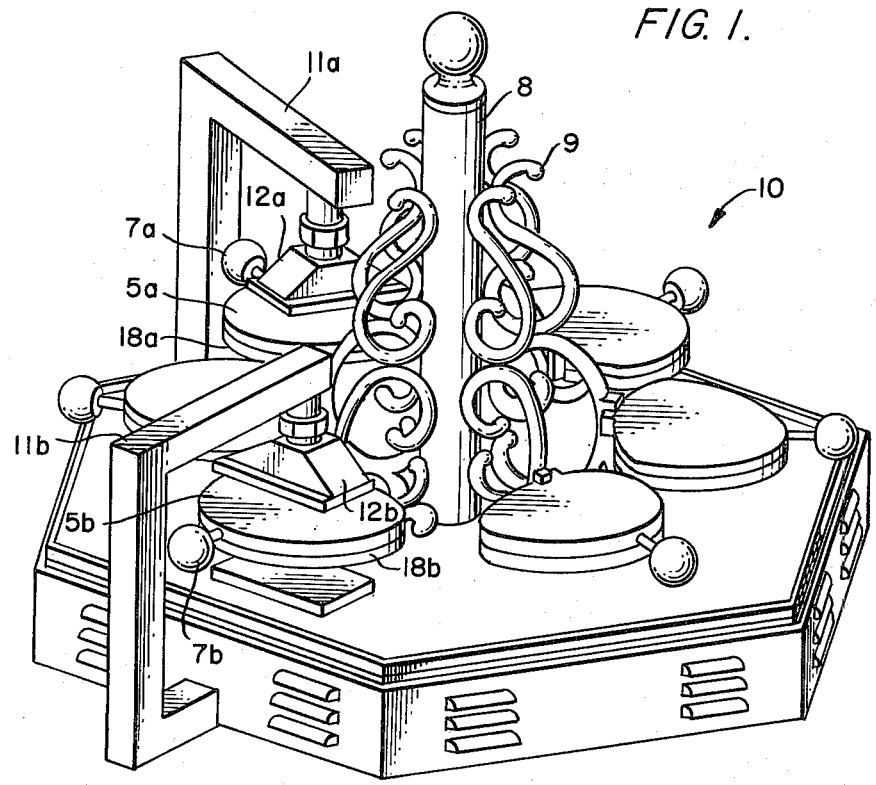
FIG. 1 is a perspective view of the baking machine of the present invention.
Figure 2:
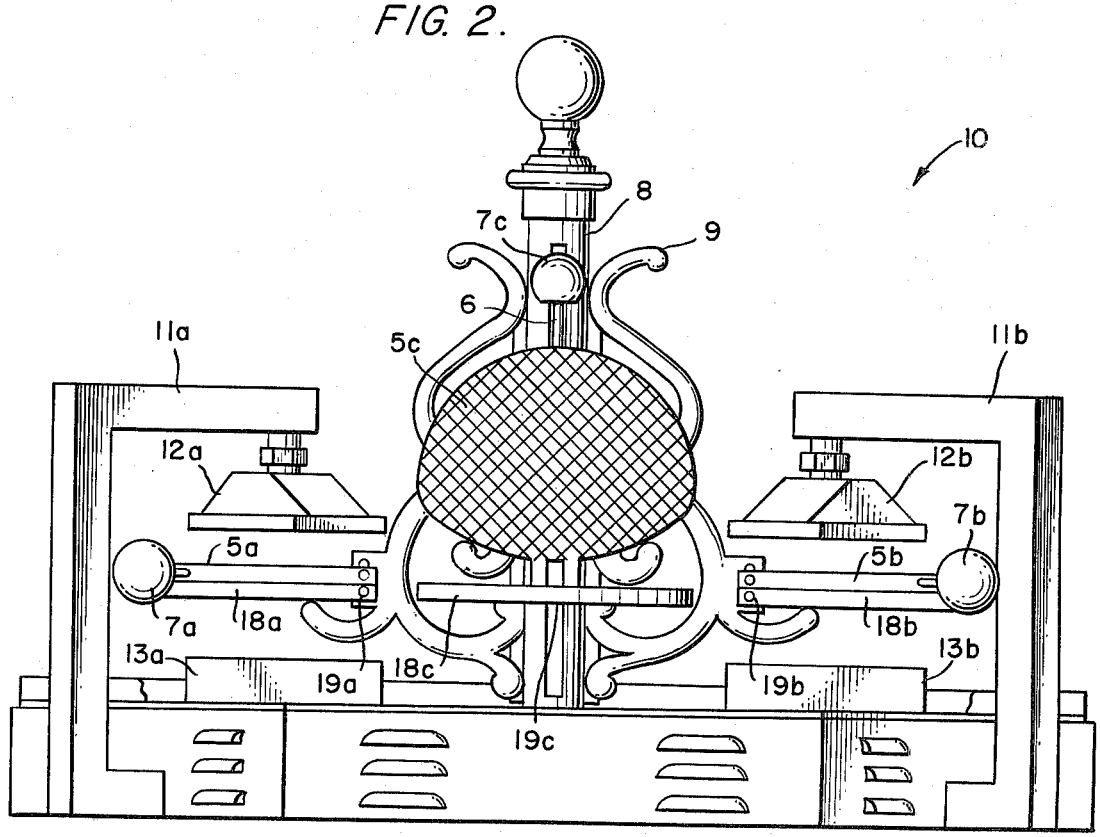
FIG. 2 is a front view of the baking machine of the invention.
Figure 3:
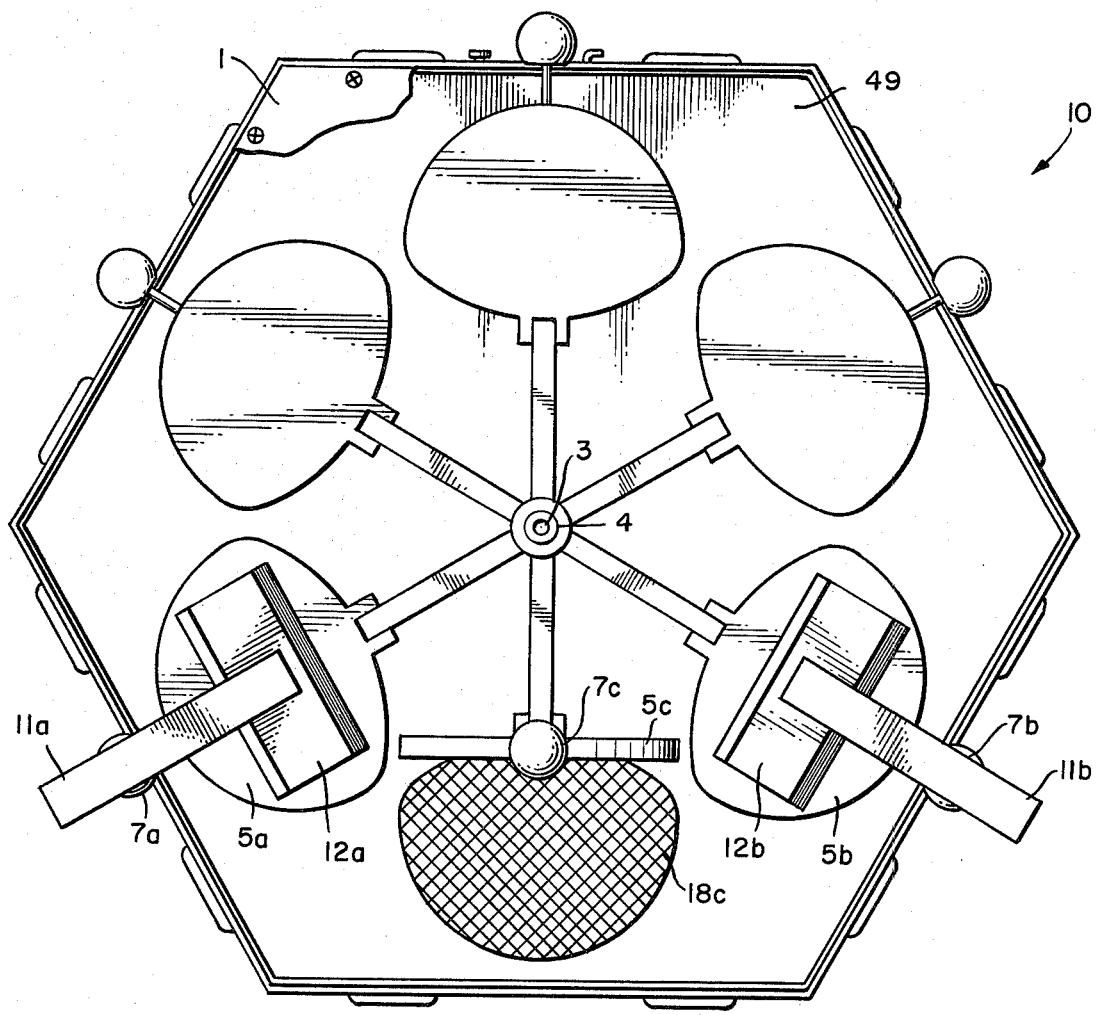
FIG. 3 is a top view of the baking machine of the invention.

Referring to FIGS. 1, 2 and 3, the baking machine 10 generally comprises a plurality of griddles having upper portions 5a–5c and lower portions 18a–18c which are carried by a center support 8 around which the griddles revolve. At one point in the path of travel of the griddles, the upper portion 5c and lower portion 18c may be separated via hinge connection 19c, and batter may be placed within a griddle.

The baking machine 10 further includes upper burners 12a, 12b and lower burners 13a, 13b providing heating zones along the path of the griddles for baking the batter contained therein. Upper burners 12a, 12b are supported by support arms 11a, 11b.

Opening and closing of the griddles is facilitated by the provision of knobs 7a–7c connected to the upper portion 5a–5c of the griddle by means of a handle stud 6.

Rotation of the griddles is facilitated by center support 3 and bearing 4. Mechanized rotation of the griddles will be described in more detail by reference to FIG. 4.

Referring to FIG. 4, movement of the griddles is provided by a motor 38 as a result of operation of a toggle switch 36 by means of which power provided through power cord 35 is supplied to the motor. Operation of the motor 38 results in turning of the gear 37.

When motion of the griddles is desired, the operator rotates control knob 45 in a given direction, such that control rod 44 which is mounted in a threaded bracket 43 moves in a direction toward the motor bracket or gear mounting 46. Resulting motion of the gear mounting 46 moves the gear 37 into engagement with the larger gear 27. As a result, gear 27 begins to rotate and motion is transmitted to the griddles.

When motion of the griddles is to be stopped, the control knob 45 is rotated in the opposite direction so that control rod 44 withdraws in a direction opposite to the gear mounting 46. In a preferred embodiment, a spring 22 is supplied between the main gear mounting 26 and the smaller gear mounting 46, such that a very responsive mechanism for disengaging the gears 37 and 27 is provided.

Figure 5A:
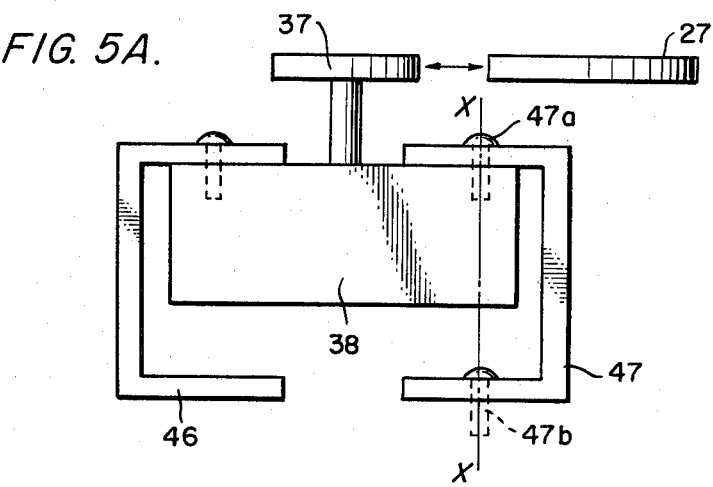
FIGS. 5A and 5B depict the motor and clutch mechanisms employed in the baking machine.
Figure 5B:
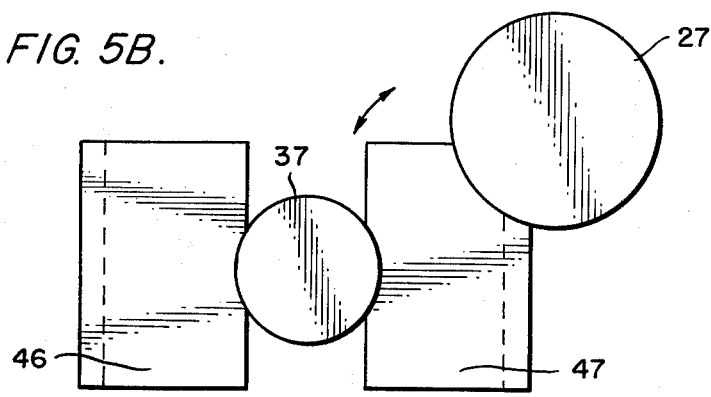

The aforementioned motor and gear arrangement, and its operation, will be more clearly understood by reference to FIGS. 5A and 5B. FIG. 5A is a side view of the motor and gear arrangement, while FIG. 5B is a bottom view thereof. It is to be understood that, for the sake of clarity in illustration, certain elements are not drawn to scale in FIGS. 5A and 5B.

As can be seen, motor 38 drives gear 37, the motor 38 being mounted in U-shaped brackets 46 and 47. When the control rod 44 is operated to force the gears 37 and 27 together, this movement take place with respect to an axis of rotation X—X corresponding to mounting bolts 47a and 47b defining the axis of rotation.

Referring to FIG. 4, operation of the top and bottom burners takes place as follows. Gas is supplied to both top and bottom burners via main supply line 34a and master valve 32a, as well as Y-shaped connector 33, bottom and top supply lines 34b and 34c, and apertures 50 and 51 located in the bottom and top burner manifolds 52 and 11. Once gas is supplied to the top and bottom burners, the burners are lit, and the supply of gas to the bottom burner and resultant intensity of the bottom burner flame can be adjusted by operation of equalizer valve 32b.

Preferably, the equalizer valve 32b is set initially, and then in normal operation only the master valve 32a need be adjusted for proper intensity of heating.

Figure 6:
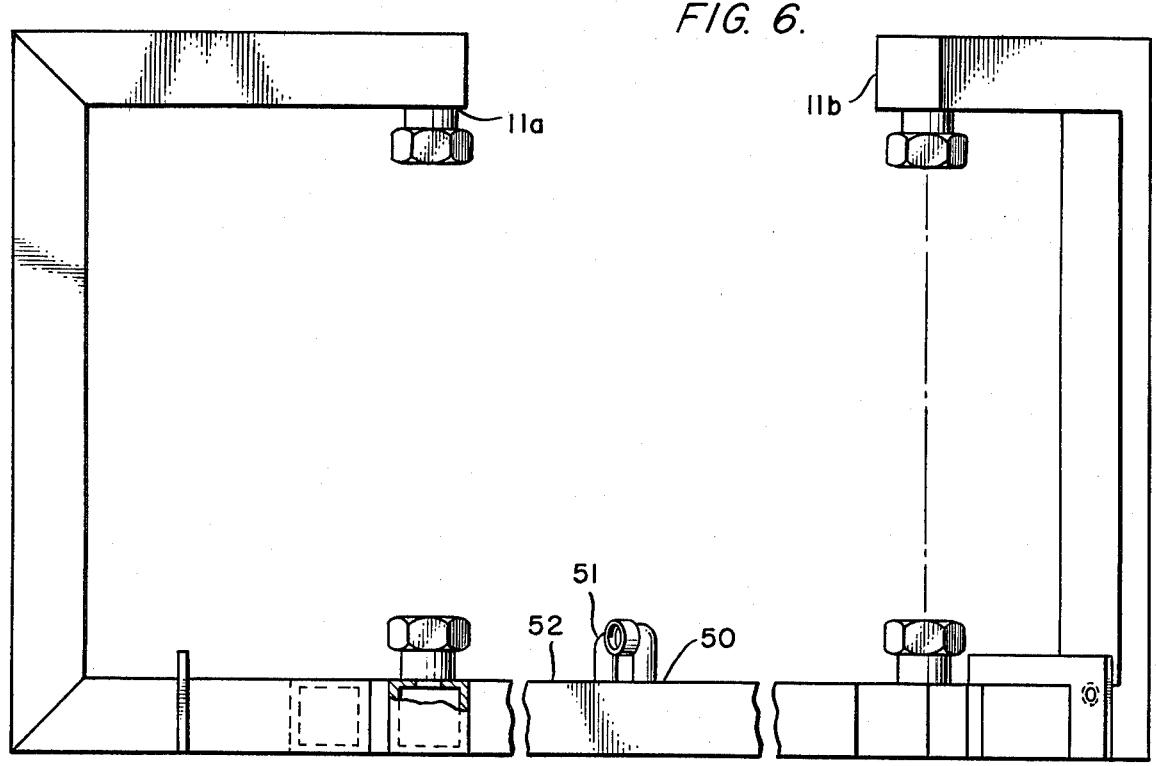
FIG. 6 depicts the gas supply system utilized in the baking machine.

Operation of the heating system can be further understood by reference to FIG. 6, which is a view of the bottom burner manifold 52 taken along the arrow B in FIG. 4. The apertures or connectors 50 and 51, to which the bottom and top supply lines 34b and 34c are respectively connected as seen in FIG. 6.

It is to be noted that motor 38 can be implemented by any conventional motor, while burners 12a–12c and 13a–13c are preferably implemented by gas-fired infrared atmospheric burners, model AB-7, manufactured by Red-Ray Manufacturing Co., Inc. of Cliffside Park, N.J.

While preferred forms and arrangements have been shown in illustrating the invention, it is to be clearly understood that various changes in detail and arrangement may be made without departing from the spirit and scope of this disclosure.

What is claimed is:

1. A baking machine for cooking batter to form ice cream cones and the like, comprising:

a plurality of griddles disposed in a generally circular arrangement in a plane for holding the batter;

support means connected to said plurality of griddles for supporting same;

heating means disposed above and below said plane for providing heat to objects passing through at least one heating zone therebetween; and motor means connected to said support means for actuating said support means to move said plurality of griddles along a path defined by said circular arrangement so that said plurality of griddles pass consecutively through said at least one heating zone, whereby said batter is cooked;

wherein said machine includes operator actuable clutch means for selectively engaging or disengaging the motor means so as to selectively drive or not drive said support means, whereby respectively to move or not move said plurality of griddles.

2. The machine of claim 1, wherein said clutch means comprises first and second gears, said first gear being selectively movable between a first non-operating position separated from said second gear and a second operating position meshed with said second gear, and an operator actuable control mechanism for selectively moving said first gear from said non-operating position to said operating position, or vice-versa, said first gear being connected to said motor means and driven thereby, said second gear being connected to said support means for driving said support means to move said plurality of griddles when said second gear is meshed with said first gear.

3. The machine of claim 2, wherein said control mechanism comprises a gear mounting holding said first gear and movable for moving said first gear from said non-operating position to said operating position, and vice-versa, and a control rod bearing against said gear mounting and actuable by the operator to forcibly move said gear mounting so as to move said first gear from said non-operating position to said operating position.

4. The machine of claim 3, wherein said control rod has a threaded portion located along its length, said threaded portion being mounted in an internally threaded mounting so that operator rotation of said control rod in one direction results in movement of said control rod toward said gear mounting to forcibly move said gear mounting so as to move said first gear into said operating position.

5. The machine of claim 4, wherein said control mechanism includes a further gear mounting holding said second gear, and spring means disposed between said gear mounting and said further gear mounting for forcing said gear mounting and said first gear into said non-operating position as said operator rotates said control rod in another direction opposite to said one direction, said rotation of said control rod in said another direction resulting in movement of said control rod away from said gear mounting.

6. The machine of claim 3, wherein said control rod is actuable by said operator so as to be withdrawn from said gear mounting, and said control mechanism includes a further gear mounting holding said second gear, and spring means disposed between said gear mounting and said further gear mounting for forcing said gear mounting and said first gear into said non-operating position as said control rod is withdrawn from said gear mounting.

7. The machine of claims 5 or 6, wherein said spring means comprises a spring and a stop screw axially mounted within said spring and extending between said gear mounting and said additional gear mounting to limit the movement of said gear mounting toward said further gear mounting, whereby to provide for proper meshing of said first and second gears.

8. The machine of claim 7, wherein said stop screw is threadably mounted in one of said gear mounting and said further gear mounting, and is adjustable to vary the degree of movement of said gear mounting toward said further gear mounting.

9. A baking machine for cooking batter to form ice cream cones and the like, comprising:

a plurality of griddles disposed in a generally circular arrangement in a plane for holding the batter;

support means connected to said plurality of griddles for supporting same;

heating means disposed above and below said plane for providing heat to objects passing through at least one heating zone therebetween; and motor means connected to said support means for actuating said support means to move said plurality of griddles along a path defined by said circular arrangement so that said plurality of griddles pass consecutively through said at least one heating zone, whereby said batter is cooked;

wherein said heating means comprises at least one pair of burners including a top burner mounted above said plane and a bottom burner mounted below said plane, and a gas supply line including a main supply line, at least one top supply line and at least one bottom supply line, said at least one top supply line and said at least one bottom supply line being connected to said main supply line by a Y-type connector; and wherein said heating means further comprises master valve means positioned in said main supply line for controlling the flow of gas therethrough, and equalizer valve means positioned in one of said at least one top supply line and said at least one bottom supply line for controlling the flow of gas therethrough.

10. The machine of claim 9, wherein said equalizer valve means is positioned in each said at least one top supply line.

11. The machine of claim 9, wherein said equalizer valve means is positioned in each said at least one bottom supply line.

* * * * *